United States Patent [19]
Williamson

[11] Patent Number: 5,821,203
[45] Date of Patent: Oct. 13, 1998

[54] FOAMED DRILLING FLUIDS, THEIR PROCESS FOR PREPARATION AND THE CORRESPONDING DRILLING METHOD

[75] Inventor: Larry Don Williamson, St. Cloud, France

[73] Assignee: Dowell, a division of Schlumberger Technology Corporation, Sugar Land, Tex.

[21] Appl. No.: 612,838

[22] PCT Filed: Aug. 4, 1995

[86] PCT No.: PCT/EP95/03102

§ 371 Date: Jun. 7, 1996

§ 102(e) Date: Jun. 7, 1996

[87] PCT Pub. No.: WO96/04350

PCT Pub. Date: Feb. 15, 1996

[30] Foreign Application Priority Data

Aug. 4, 1994 [FR] France ............................. 94401810.0

[51] Int. Cl.⁶ ..................................................... C09K 7/02
[52] U.S. Cl. ........................ 507/102; 507/111; 507/113; 507/140; 507/141; 507/145; 166/309
[58] Field of Search ................................. 507/102, 202, 507/111, 113, 140, 141, 145; 166/309

[56] References Cited

U.S. PATENT DOCUMENTS

| | | |
|---|---|---|
| 3,323,593 | 6/1967 | Foshee et al. . |
| 4,088,583 | 5/1978 | Pyle et al. ................................ 507/102 |
| 4,092,252 | 5/1978 | Fischer et al. . |
| 5,565,416 | 10/1996 | Wu ........................................ 507/102 |

FOREIGN PATENT DOCUMENTS

| | | |
|---|---|---|
| A-0 207810 | 1/1987 | European Pat. Off. . |
| A-0 207811 | 1/1987 | European Pat. Off. . |
| WO-A-92 18238 | 10/1992 | WIPO . |

OTHER PUBLICATIONS

Gray, Composition and Properties of Oil Well Drilling Fluids, Fourth Edition, p. 331, (1980).

*Primary Examiner*—Philip Tucker
*Attorney, Agent, or Firm*—John E. Vick, Jr.; Douglas Y. Barbo

[57] ABSTRACT

The present invention is directed to an aqueous foamed Drilling Fluid for drilling well bores into a subterranean formation, comprising water, at least one clay and at least one foaming agent. According to the invention, it further comprises at least one metal hydroxide. The invention further relates to a method for preparing said foamed drilling fluid.

32 Claims, No Drawings

FOAMED DRILLING FLUIDS, THEIR PROCESS FOR PREPARATION AND THE CORRESPONDING DRILLING METHOD

This application is a 371 of PCT/EP95/03102 filed Aug. 4, 1995.

The present invention is directed to novel foamed drilling fluids, their preparation and their use. The present invention relates also to a method for breaking a foamed drilling fluid.

Drilling fluids have been used for decades in the oilfield industry. As it is well known, such fluids are mainly based on a water and clay mixture plus various additives aimed at adjusting their rheology and suspending properties.

The general composition and properties of drilling fluids (or drilling muds) are well known of the skilled man and shall not be repeated here.

In the past decade, mixed metal hydroxides (or "MMH") have been developed, especially with reference to J. L. Burba et al in U.S. Pat. No. 4,664,843 and U.S. Pat. No. 4,790,954, whose teaching is incorporated herein by reference.

Drilling fluids incorporating MMH are disclosed in EP-A-501069. The said fluids are made of MMH and a mineral clay, especially bentonite, so as to impart the desired rheological properties to the fluid, and of an effective amount of a fluid loss control additive which can be generically described as a carboxymethyl substituted starch (cross-linked or not) or cellulosic compound, having a defined degree of substitution, and water plus other common additives.

With that technology, density can be as low as about 8.5 ppg (1.02 g/cm$^3$) without oil or about 7.9 ppg (0.95 g/cm$^3$) with some 40% by volume of emulsified diesel oil.

Currently there are not known low density recirculating drilling fluids. In situations where low densities are required, the industry is forced to use air or foam drilling techniques. However, such conventional foamed drilling fluids are normally not circulated.

One foam process has been proposed which relies on a pH sensitive foaming agent: the foam is chemically broken on surface with an acid, the solids are removed, the pH is adjusted back to basic then the fluid is refoamed and pumped back downhole. This "chemical" process is of a complex nature, requires additional products to twice adjust the pH, and does not address static suspension of the cuttings or well bore support. Each one of these drawbacks is serious.

There exists a definite need in the oilfield industry, and similar industries such as geothermal wells and depleted or low pressure reservoir etc . . . , for low density drilling fluids.

However, this need was never matched in the past, or only with drawbacks so serious that the practical use on the field was barely possible or only with serious associated problems.

It is an object of the present invention to provide drilling fluids covering a wide range of low densities, in particular from about 2.0 ppg (0.24 g/cm$^3$) to 8.0 ppg (0.96 g/cm$^3$).

It is a further object of the present invention to provide such drilling fluids under the form of a foam.

It is a further object of the present invention to provide a method for preparing such drilling fluids, and for using them for drilling operations.

A further object of the present invention is to provide a method for mechanically breaking a foamed drilling fluid, which method can be incorporated into the above mentioned method for drilling a well.

It has been surprisingly discovered that the use of metal hydroxides in a foamed drilling fluid allows to reach low densities of the foamed fluid while maintaining very efficient rheological and suspending properties.

The source of metal hydroxide can be a single metal hydroxide, or a blend of such metal hydroxides, for example aluminium hydroxide and/or magnesium hydroxide and/or similar hydroxides, or mixed metal hydroxides such as disclosed in the prior art, or precursors of such hydroxides (for example a metal oxide to be used in basic conditions).

According to a preferred embodiment, said metal hydroxide component is a mixed metal layered hydroxide compound of the following empirical formula:

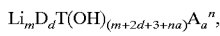

$$Li_m D_d T(OH)_{(m+2d+3+na)} A_a^n,$$

where m represents the number of Li ions present (preferably 0);

D represents divalent metal ions such as Mg, Ca, Ba, Sr, Mn, Fe, Co, Ni, Cu, Zn, most preferably Mg, or mixtures thereof;

d is the number of ions of D in the formula, preferably from 0 to about 4, and most preferably about 1;

T represents trivalent metal ions and may be Al, Ga, Cr or Fe, preferably Al;

A represents monovalent or polyvalent anions other than OH ions and may be inorganic ions such as: halide, sulphate, nitrate, phosphate, carbonate, most preferably halide, sulphate, phosphate, or carbonate, or they may be hydrophilic organic ions such as glycolate, lignosulphate, polycarboxylate, or polyacrylates;

a is the number of ions of A in the formula;

n is the valence of A; and where (m+2d+3+na) is equal to or greater than 3.

Particularly preferred is the mixed metal hydroxide of the formula $MgAl(OH)_{4.7}Cl_{0.3}$.

In their broad sense, the foamed drilling fluids according to the invention shall consist of:

at least a "metal hydroxide" as above defined;

at least a clay, such as bentonite, or a similar viscosifying agent;

at least a foaming agent;

water;

a foam-generating gas or a blend of such gases, such as air, $N_2$, $CO_2$, $N_2/CO_2$, etc . . .

Apart from bentonite, similar suitable clays are for example sepiolite, hectorite, attipulgite (said listing being non-exhaustive), in concentration ranges from 3 to 20 pounds per barrel (8.56 g/l to 57.11 g/l).

As foaming agent may be used non-ionic to cationic surfactants, in a range of about 0.01 to 1.5% by volume.

The process for generating the foamed drilling fluid shall consist of: blending the "metal hydroxide" component with the clay component, caustic soda or a similar alkali to set up an alkaline pH and water, then introducing an efficient quantity of the foaming agent and an efficient quantity of the foaming gas(es), optionally with appropriate amounts of other additives. The foam may be either formed before the injection or downhole.

Among the said additives, one of particular interest is a fluid loss control agent. Suitable fluid loss control agents are for example polyanionic cellulose, starches, carboxycellulose or preferably a fluid loss control agent as described in EP-A-501069, i.e. a carboxymethylated starch or carboxymethylated cellulosic having a controlled degree of substitution. A preferred fluid loss control additive includes carboxymethylated starches where the starch source may be a crosslinked vegetable starch, such as potato, rice, corn, maize, or other starch containing products of carboxymethyl cellulose or an uncrosslinked vegetable starch as set forth above and where the crosslinked vegetable starch has a degree of substitution in the broad range of about 0.3 to about 0.8 and preferably in the narrow range of about 0.4 to about 0.7; and where the uncrosslinked vegetable starch and the carboxymethylcellulose have a degree of substitution in the broad range of about 0.3 to 0.57 and preferably in the narrow range of about 0.3 to 0.4. As used herein, the term "uncrosslinked" is intended to mean that the material is substantially free of crosslinking. The starches may be crosslinked or not as desired.

Other conventional additives are for example polyanionic cellulose, common anti corrosive agents such as oxygen scavengers and antibacterial agents.

According to another aspect of the invention, a well bore drilling process is provided, in which a drilling fluid is pumped under the form of a foam, for example, as described above, circulated downhole and up to the surface where it is mechanically broken, the valuable chemicals on the one side and the cuttings and debris on the other side are recovered, then a foamed drilling fluid is generated again and pumped back into the well. Optionally, the foam is formed in-situ, downhole.

Recovered valuable chemicals such as metal hydroxides and especially MMH are most preferably reused in the process.

Surprisingly, the present invention provides a low density foamed drilling fluid, as a stable, stiff foam having the desired set of rheological properties, which can be mechanically broken, and can be circulated.

By "mechanically broken", it is meant that the foam arriving at the surface is passed through conventional centrifuges or super centrifuges and similar, well-known equipment being present on the drilling rig, with no addition of chemical breakers such as acids.

In the considered examples,

MMH means an Al/Mg mixed hydroxide of the formula MgAl(OH)$_{4.7}$Cl$_{0.3}$

CCS means a fluid loss control agent consisting of a crosslinked carboxymethylated potato starch having a degree of substitution of 0.56 (such as disclosed in EP-A-501069)

Foamant agent means a cationic surfactant (F 078 of the "Compagnie des Services Dowell Schlumberger, a French Registered Company).

All lab analysis are as per API RP 13 B where applicable.

All mixing was performed on Hamilton Beach Triple Spindle Mixers. The viscosity properties at various sheer rates (RPM of agitation) and other rheological properties were obtained using a fann viscosimeter.

Mud weight can be checked using a standard mud scale or an analytical balance. It must be noted that the MMH foam is stiff enough and has sufficient half life to allow the rheology to be checked utilising a standard rheometer. Fluid loss can be checked with a standard API fluid loss cell.

EXAMPLE 1

Formulation # 1 (Order of addition as noted)

1) 116 mls Bentonite, pre hydrated in fresh water
2) 234 mls tap water
3) 1.0 g MMH
4) Caustic solution to pH 11.0±0.2
5) 1.6 mls foamant

| Shear rates (rpm): | 600 | Dial reading or "Fann Units": | 65 |
|---|---|---|---|
| | 300 | | 45 |
| | 200 | | 37 |
| | 100 | | 29 |
| | 6 | | 14 |
| | 3 | | 13 |
| 10-s Gel Strength: | | 10 lb/100 ft$^2$ (48.8 kg/100 m$^2$) | |
| 10-min Gel Strength: | | 10 lb/100 ft$^2$ (48.8 kg/100 m$^2$) | |
| Plastic Viscosity: | | 20 cp (20 mPas) | |
| Yield Point: | | 25 lb/100 ft$^2$ (122 kg/100 m$^2$) | |
| Density: | | 3.49 ppg (0.42 g/cm$^3$) | |
| API Fluid Loss in 30 min.: | | 11.5 cc | |
| Specific gravity: | | 0.42 | |

The foam generated appeared very stiff and would not pour out of the mixing cup without agitation.

A formulation identical to formulation #1 except the addition of a fluid loss control additive (4 ppb CCS) produced a 6.8 cc API Fluid loss and a much stiffer foam as noted in the rheology values below.

| Shear rates (rpm): | 600 | Fann Units": | 175 |
|---|---|---|---|
| | 300 | | 133 |
| | 200 | | 104 |
| | 100 | | 89 |
| | 6 | | 48 |
| | 3 | | 48 |
| 10-s Gel Strength: | | 45 lb/100 ft$^2$ (219.6 kg/100 m$^2$) | |
| 10-s Gel Strength: | | 75 lb/100 ft$^2$ (366 kg/100 m$^2$) | |

CONCLUSIONS

The MMH system can easily be foamed producing a fluid of excellent quality. The system appears to produce excellent foam height and an unusually long half life. By adjusting the amounts of foamant and agitation applied, a wide range of densities may be produced.

EXAMPLE 2

Formulation #2

Formulation 2 was identical to Formulation 1 except that the MMH was not added. The resultant foam was thin and began to reduce immediately; Rheology and other properties were not measured as the foam did not last long enough for measurement.

Test for Column Height Production and Foam Half Life

Formulation 1 was reduced from a 1 lab bbl formulation to 100 mls for the Column Height Production Test. A good foam should produce an increase in foam height from a base of 100 mls to a height of 300 mls or greater upon the addition of the foamant.

33 mls S18 API grade Wyoming bentonite, pre-hydrated in fresh water 66 mls Tap Water 0.29 g MMH Caustic to pH 11.0±0.2

0.46mls Foamant

Base Vol. 100 mls

Head Height after Foamant 350 mls (Petrolite KD-40 of International Drifting Fluids Inc.).

The MMH foam produced quite an acceptable foam height.

The foam half life (time in minutes for 50% of the original water to breakout) should be no less than 2½ min. The MMH foam produced a half life of slightly more than 3 hours; a very stable foam. Once half life was obtained, the material was placed on a Hamilton Beach Blender for 30 seconds. The foam readily regenerated.

EXAMPLE 3

1. OPTIMUM DOSE OF FOAMING AGENT 1.1 Procedure

Five standard MMH muds were mixed and foaming agent was added at the following concentrations:

| MUD No. | 1 | 2 | 3 | 4 | 5 |
|---|---|---|---|---|---|
| MMH: ppb (g/l) | 1 (2.5) | 1 (2.5) | 1 (2.5) | 1 (2.5) | 1 (2.5) |
| Bentonite: ppb (g/l) | 10 (25) | 10 (25) | 10 (25) | 10 (25) | 10 (25) |
| NaOH | => pH 10.5 | => pH 10.5 | => pH 10.5 | => pH 10.5 | => pH 10.5 |
| Foaming agent/ml | 0.1 | 0.3 | 0.5 | 0.7 | 0.9 |

1.2 Mixing Procedure

Using a Hamilton Beach mixer:
1. Mix Bentonite+Water 5 min @ low speed.
2. Add MMH.
3. Adjust pH→10.5.
4. Mix 5 min @ low.
5. Add foaming agent, miss 2 min @ high.
6. Measure Rheology and density.
7. Mix 1 min @ high.
8. Measure water break out.

1.3 Testing Procedure

Rheology: Fann 35 @ 122° F. (50° C.)

Density: Use a 10 ml tared syringe to measure wt of 10 ml foam and therefore the equivalent ppg can be determined.

Water Breakout: Pour as much of the foam as possible into a 500 ml glass measuring cylinder, measure the foam height, and after 60 min measure any water breakout.

1.4 Optimum Dose Results

| MUD No. | 1 | 2 | 3 | 4 | 5 |
|---|---|---|---|---|---|
| Foam Height/mls | 380 | 520 | 580 | 630 | 620 |
| Water Breakout/60 mins | 0 | 0 | 0 | 0 | 0 |
| Rheology | | | | | |
| 600 rpm | 58 | 96 | 122 | 126 | 115 |
| 300 rpm | 53 | 82 | 100 | 104 | 94 |
| 200 rpm | 50 | 75 | 88 | 94 | 86 |
| 100 rpm | 44 | 67 | 81 | 85 | 80 |
| 6 rpm | 30 | 49 | 43 | 32 | 39 |
| 3 rpm | 28 | 43 | 25 | 24 | 29 |
| 10 s Gel Strength | | | | | |
| lb/100 ft$^2$ | 16 | 29 | 45 | 47 | 39 |
| kg/100 m$^2$ | 78.08 | 141.52 | 219.6 | 229.36 | 190.32 |
| 10 min Gel Strength | | | | | |
| lb/100 ft$^2$ | 15 | 25 | 40 | 45 | 35 |
| kg/100 m$^2$ | 73.2 | 122 | 195.2 | 219.6 | 170.8 |
| Density | | | | | |
| ppg | 7.85 | 5.03 | 4.87 | 4.44 | 4.79 |
| g/cm$^3$ | 0.94 | 0.60 | 0.58 | 0.53 | 0.57 |

1.5 Conclusions

A dose of 0.7 mls of foaming agent gave the greatest amount of foam and was the least dense.

2. FOAM STABILITY

Three tests were to be used to gauge the stability of foam MMH.

2.1 Test 1

2.1.1 Procedure
1. Mix foam MMH as before but at these concentrations:
   Bentonite=12 ppb (34.26 g/l)
   MMH=1.2 ppb (3.43 g/l)
   Foaming agent=1 ml
2. Check density of foam.
3. Pour into 500 ml measuring cylinder and measure foam generated.
4. Record Water Breakout/30 min.
5. Mix by inversion of cylinder.
6. Pour into bomb and hot roll @ 150° F. (65° C.) for 16 hrs.
7. Pour into cylinder and measure water breakout and appearance.

2.2 Test 2—Procedure

1–5 As Test 1.
6. Pour into bomb and static age @ 150° F. (65° C.) for 16 hrs.
7. As Test 1.

2.3 Test 3

2.3.1 Procedure
1. Mix 2 BBL of Test 1 formulation.
2. Check density.
3. Using a Marsh funnel, pour foam through screen and catch in funnel.
4. Empty into beaker and check density.
5. Repeat steps 3+4 (7–10 times).
6. Re-mix mud to refoam.
7. Check density.

2.3.2 Results

| BEFORE HOT ROLL TEST | 1 | 2 |
|---|---|---|
| Foam Density | 5.49 ppg (0.66 g/l) | 5.61 ppg (0.67 g/l) |
| Foam Vol./mls | 550 Vol. | 500 mls |
| 30 min Water Breakout | 0 | 0 |

Appearance

After Hot Roll

Mud seems to have lost some volume. It has more "liquid" properties—not as stiff as before hot roll (BHR) foam. Foam is more pourable and seems to have held together.

Density=7.1 ppg. (0.85 g/l)

After Static Ageing

Mud looks as it did when put in. It didn't pour—had to be scraped out into cylinder where about 85 mls H$_2$O was visible.

2.4 Test 4

| | ppg | g/l |
|---|---|---|
| Density after mixing/ppg | 4.43 | 0.53 |
| Density after 1 pass through screen | 5.56 | 0.67 |
| Density after 2 passes through screen | 5.50 | 0.60 |
| Density after 3 passes through screen | 5.44 | 0.65 |

-continued

|  | ppg | g/l |
|---|---|---|
| Density after 4 passes through screen | 5.69 | 0.68 |
| Density after 5 passes through screen | 5.48 | 0.66 |
| Density after 6 passes through screen | 5.34 | 0.64 |
| Density after 7 passes through screen | 5.31 | 0.64 |
| Density after remixing 2 min on HB @ high speed | 5.13 | 0.61 |
| Density after remixing 2 min on Silverson @ 6000 rpm | 4.77 | 0.57 |

2.5 Conclusions

Foamed MMH after hot rolling seemed to hold together as a mud system with no water breakout but it did gain density. It was also a lot more pourable than BHR foam which was probably due to foam being less aerated.

After static ageing, the foam had stayed in place but there has been water breakout which could be a problem in the field.

The stability of the foam to being put through a screen was high. Although there was an initial increase in density that was due to the big bubbles being knocked out of the foam. The foam was very stable after that. It was also shown that the foam could refoam.

EXAMPLE 4

FOAMED MMH MUD—FULL SCALE TESTING

Objective

Based on the above lab data, it appears that a conventional MMH mud system can be foamed utilising a standard oil field foamant producing a functional recirculating drilling fluid of a density substantially lower than that of water. A full scale circulating system test was required to establish the viability of the concept. this test was designed to evaluate the potential for the following:

1. The ability to foam the MMH mud.
2. The ability to de-foam the mud, increasing it's density to a pumpable level using conventional solids control equipment; i.e., single deck shaker and med speed centrifuge.
3. The ability to pick up the de-foamed mud with a triplex pump.

Mixing and Pumping

A total of 40 BBL of MMH mud was mixed as follows:

| Bentonite | 440 lbs | (199.76 kg) |
|---|---|---|
| MMH | 50 lbs | (22.7 kg) |
| NaOH | to pH 12.8 | |
| Fresh water | 40 barrels | (6.360 l) |
| Foaming agent | 14 liters (0.3%) | |

The pumping schedule as below:

Pumping Schedule

Pressure test the lines up to 5000 psi (2.39 $10^5$ Pa).

Start pumping MMH at rate of 0.5 bpm through 1.5" CTU REEL @ 2000 psi (0.957 $10^5$ Pa).

After pumping 5 BBL (14.2 g/l) of mud, Nitrogen introduced to the system through foam generator at rate of 200 SCF per min, maintaining the same pumping rate at 0.5 bpm and pumping pressure increased to 4000 psi (1.915 $10^5$ Pa).

At the end of 12 BBL (34.26 g/l) nitrefied mud return observed on the shale shaker, the return was slugs of gas and clear mud without any foam.

Stop pumping and add surfactant to the system 0.3% of foaming agent.

Pump 5 BBL (14.2 g/l) of mud at rate of 0.5 bpm @ 2000 psi (0.957 $10^5$ Pa).

Introduce the nitrogen at rate of 200 SCF per min to achieve 65% foam quality @ 4300 psi (2.058 $10^5$ Pa).

After pumping 14 BBL (40 g/l) of nitrefied mud return observed on the shale shaker, the return has very high rheology, showing uniform and very stable foam Return line Choke manifold pressure maintained at 500 psi (0.24 $10^5$ Pa).

The return density measured and found equal to 3.7 ppg (0.44 g/l).

By passing the stable foam through the centrifuge the density increased up to 5.5 ppg (0.66 g/l).

Sampling was attempted for MMH mud both with and without foamant. Ax samples are without foamant while Bx samples contain 0.3% foamant. The sampling points were:

1. Mix tank
2. Post coil tubing
3. Pre shaker screen
4. Post centrifuge.

| Sample/ Property | A1 | A2 | A3 | A4 | B1 | B2 | B3 | B4 |
|---|---|---|---|---|---|---|---|---|
| Rheology (Fann Unit) | | | | | | | | |
| 600 rpm | | 88 | 77 | 57 | | 178 | | 79 |
| 300 rpm | | 61 | 57 | 40 | | 142 | | 61 |
| 200 rpm | | 48 | 47 | 35 | | 128 | | 38 |
| 100 rpm | | 39 | 39 | 29 | | 92 | | 29 |
| 6 rpm | | 25 | 24 | 19 | | 45 | | 18 |
| 3 rpm | | 10 | 9 | 6 | | 45 | | 13 |
| 10 s Gel Strength | | | | | | | | |
| lb/100 ft$^2$ | | 11 | 12 | 7 | | 82 | | 22 |
| kg/100 m$^2$ | | 53.68 | 58.56 | 34.16 | | 400.16 | | 107.36 |
| Density | | | | | | | | |
| ppg | | 7.91 | 8.32 | 8.27 | 8.52 | 3.6 | 3.14 | 5.5 |
| g/l | | 0.95 | 1.00 | 0.99 | 1.02 | 0.43 | 0.38 | 0.66 |

Note: the density in the coil was measured at 4.72 ppg by extraction of a sample and direct measurement Half life was determined using a 500 ml graduate.

| Sample | B2 | B4 |
|---|---|---|
| start time | 11:30 am 9/4/94 | 12:30 pm |
| start vol. mls | 535 | 500 |
| stop time | 9:00 am 11/4/94 | 9:00 am 11/4/94 |
| elapsed time | 45.5 hrs | 44.5 hrs |
| total vol. at end mls | 350 mls | 500 |
| foam vol. at end mls | 230 mls | 340 |
| water break out at end in mls | 120 mls | 160 |

Half life was not reached on either sample.

Conclusions and Recommendations

Each objective was reached. The MMH mud can be foamed utilising foamant. De-foaming was not completely accomplished utilising the available equipment. The single deck shaker was found to be somewhat useless, however, in retrospect the mud was mixed twice as thick as would normally be necessary. The centrifuge did produce a density increase of 2.0 ppg (0.24 g/l) in one pass. Even with the foam as stiff as it was, the C-pump picked up and delivered the foam to the centrifuge with no problem. Subsequent passes through the centrifuge produced no increase in density indicating that the G-force of the unit was most likely responsible for the density change.

EXAMPLE 5

5.1 Preparation of single metal hydroxides

Single metal hydroxides were made in the lab using the reactions below which precipitate out the insoluble metal hydroxide.

1. $MgSO_4 \cdot 7H_2O + 2NaOH \rightleftharpoons Mg(OH)_2 + Na_2SO_4 + 7 H_2O$
2. $Al_2(SO_4)_3 \cdot 16 H_2O + 6 NaOH \rightleftharpoons 2 Al(OH)_3 + 3 Na_2SO_4 + 16H_2O$ The reaction was carried out by dissolving the metal sulphate in water. The sodium hydroxide was then added to precipitate out the metal hydroxide. The resultant solution was filtered, washed and dried in oven at 105° C.

5.2 Formulations

| | |
|---|---|
| Fresh water | 350.0 g |
| Bentonite (dry) | 12.0 g |
| Metal hydroxide | 1.2 g |
| Foamant | 1.0 ml |

5.3 Results 5.3.1 Magnesium hydroxide

| Temperature | Unfoamed 50° C. | Foamed Ambient |
|---|---|---|
| Rheology (Fann Unit) | | |
| 600 rpm | 57 | 149 |
| 300 rpm | 52 | 129 |
| 200 rpm | 47 | 117 |
| 100 rpm | 41 | 110 |
| 6 rpm | 27 | 78 |
| 3 rpm | 20 | 34 |
| 10 s Gel Strength | 76.1 kg/100 m² | |
| 10 min Gel Strength | 110.9 kg/100 m² | |
| Foam volume: | | |
| start | | 450 ml |
| 18 hours | | 450 ml |
| Water break out | | 10 ml |

This combination worked giving a good foam; however the foam was not as stiff as the MMH foam.

5.3.2 Aluminium hydroxide

| Temperature | Unfoamed 50° C. | Foamed Ambient |
|---|---|---|
| Rheology (Fann Unit) | | |
| 600 rpm | 105 | 112 |
| 300 rpm | 96 | 91 |
| 200 rpm | 88 | 81 |
| 100 rpm | 80 | 79 |
| 6 rpm | 40 | 38 |
| 3 rpm | 22 | 28 |
| 10 s Gel Strength | 147.8 kg/100 m² | 152.3 kg/100 m² |
| 10 min Gel Strength | 147.8 kg/100 m² | 147.8 kg/100 m² |
| Foam volume: | | |
| start | | 470 ml |
| 18 hours | | 470 ml |
| Water break out | | 30 ml |

This combination gave a stiffer foam than the magnesium foam but it was still not as stiff as the MMH foam.

I claim:

1. An aqueous foamed drilling fluid comprising water, at least one clay, at least one foaming agent, a foam generating gas or blend of such gases, and at least one additive component selected from aluminum hydroxide, magnesium hydroxide, mixed metal hydroxides, and blends thereof.

2. The aqueous foamed drilling fluid of claim 1 in which the additive component is a mixed metal hydroxide or blend of mixed metal hydroxides.

3. The aqueous foamed drilling fluid of claim 1 in which the additive component is selected from aluminum hydroxide or magnesium hydroxide.

4. The aqueous foamed drilling fluid of claim 1 in which the additive component is present in an amount effective to provide a density of said aqueous foamed drilling fluid of from about 2.0 pounds per gallon to about 8.0 pounds per gallon.

5. An aqueous foamed drilling fluid formed by blending (1) at least one additive component selected from aluminum hydroxide, magnesium hydroxide, mixed metal hydroxides, and blends thereof; (2) clay; (3) a pH modifying agent selected from caustic soda or similar alkali sufficient to provide an alkaline pH; (4) and water; and introducing an efficient quantity of foaming agent and an efficient quantity of foaming gas or gases.

6. An aqueous foamed drilling fluid formed by blending (1) at least one additive selected from aluminum hydroxide, magnesium hydroxide, mixed metal hydroxides, and blends thereof; (2) clay; (3) a pH modifying agent selected from alkali metal hydroxides and carbonates in a concentration sufficient to provide an alkaline pH; (4) and water; and introducing an efficient quantity of foaming agent and an efficient quantity of foaming gas or gases.

7. The aqueous foamed drilling fluid of claim 1 in which the additive component is a mixed metal hydroxide having the formula $$Li_m D_d T(OH)_{(m+2d+3+na)} A_a^n$$

wherein m represents the number of Li ions present; including 0;

D represents a divalent metal selected from Mg, Ca, Ba, Sr, Mn, Fe, Co, Ni, Cu, and Zn;

d is a number from 1 to about 4;

T is a trivalent metal;

A is a mono or polyvalent anion, other than OH;

a represents the number of A ions present;

n is the valence of A;

and (m+2d+3+na) is equal to or greater than 3.

8. The aqueous foamed drilling fluid of claim 1 in which the additive component is a mixed metal hydroxide having the formula $$D_d T(OH)_{(2d+3+na)} A_a^n$$

wherein

D represents a divalent metal selected from Mg, Ca, Ba, Sr, Mn, Fe, Co, Ni, Cu, and Zn;

d is a number from 1 to about 4;

T is a trivalent metal;

A is a mono or polyvalent anion, other than OH;

a represents the number of A ions present;

n is the valence of A;

and (2d+3+na) is equal to or greater than 3.

9. The aqueous foamed drilling fluid of claim 5 in which the additive component is a mixed metal hydroxide having the formula $$Li_m D_d T(OH)_{(m+2d+3+na)} A_a^n$$

wherein
  m represents the number of Li ions present; including 0;
  D represents a divalent metal selected from Mg, Ca, Ba, Sr, Mn, Fe, Co, Ni, Cu, and Zn;
  d is a number from 1 to about 4;
  T is a trivalent metal;
  A is a mono or polyvalent anion, other than OH;
  a represents the number of A ions present;
  n is the valence of A;
and (m+2d+3+na) is equal to or greater than 3.

10. The aqueous foamed drilling fluid of claim 5 in which the additive component is a mixed metal hydroxide having the formula $$D_dT(OH)_{(2d+3+na)}A_a^n$$

wherein
  D represents a divalent metal selected from Mg, Ca, Ba, Sr, Mn, Fe, Co, Ni, Cu, and Zn;
  d is a number from 1 to about 4;
  T is a trivalent metal;
  A is a mono or polyvalent anion, other than OH;
  a represents the number of A ions present;
  n is the valence of A;
and (2d+3+na) is equal to or greater than 3.

11. The aqueous foamed drilling fluid of claim 7 in which the divalent metal is Mg and the trivalent metal is Al.

12. The aqueous foamed drilling fluid of claim 1 in which the additive component is a mixed metal hydroxide having the formula $MgAl(OH)_{4.7}Cl_{0.3}$.

13. The aqueous foamed drilling fluid of claim 5 in which the additive component is a mixed metal hydroxide having the formula $MgAl(OH)_{4.7}Cl_{0.3}$.

14. The aqueous foamed drilling fluid of claim 1 containing a fluid loss control agent.

15. The aqueous foamed drilling fluid of claim 5 containing a fluid loss control agent.

16. The aqueous foamed drilling fluid of claim 15 in which the fluid loss control agent is selected from carboxymethyl starch; crosslinked carboxymethyl starch; and carboxymethyl cellulosic compounds having a low degree of substitution.

17. The aqueous foamed drilling fluid of claim 1 in which the concentration of clay is from 8.56 to 57.11 g/l.

18. The aqueous foamed drilling fluid of claim 5 in which the concentration of clay is from 8.56 to 57.11 g/l.

19. The aqueous foamed drilling fluid of claim 17 in which the concentration of foaming agent is from 0.1 to 1.5 percent by volume.

20. The aqueous foamed drilling fluid of claim 18 in which the concentration of foaming agent is from 0.1 to 1.5 percent by volume.

21. The aqueous foamed drilling fluid of claim 19 in which the foam generating gas is selected from air, $CO_2$, $N_2$, and mixtures thereof.

22. The aqueous foamed drilling fluid of claim 20 in which the foam generating gas is selected from air, $CO_2$, $N_2$, and mixtures thereof.

23. The aqueous foamed drilling fluid of claim 20 in which the additive component is a mixed metal hydroxide having the formula $$Li_mD_dT(OH)_{(m+2d+3+na)}A_a^n$$

wherein
  m represents the number of Li ions present; including 0;
  D represents a divalent metal selected from Mg, Ca, Ba, Sr, Mn, Fe, Co, Ni, Cu, and Zn;
  d is a number from 1 to about 4;
  T is a trivalent metal;
  A is a mono or polyvalent anion, other than OH;
  a represents the number of A ions present;
  n is the valence of A;
and (m+2d+3+na) is equal to or greater than 3.

24. A method for preparing an aqueous foamed drilling fluid comprising blending (1) an additive component selected from aluminum hydroxide, magnesium hydroxide, mixed metal hydroxides, and blends thereof; (2) clay; (3) a pH modifying agent selected from caustic soda or similar alkali in a concentration sufficient to provide an alkaline pH; (4) and water; and introducing an efficient quantity of foaming agent and an efficient quantity of foaming gas or gases.

25. The method of claim 24 in which the pH modifying agent is caustic soda.

26. The method of claim 24 in which the pH modifying agent is selected from potassium hydroxide, lithium hydroxide, sodium carbonate, potassium carbonate, and lithium carbonate.

27. A method comprising blending (1) an additive component selected from aluminum hydroxide, magnesium hydroxide, mixed metal hydroxides, and blends thereof, (2) clay, (3) a pH modifying agent selected from caustic soda or similar alkali in a concentration sufficient to provide an alkaline pH; (4) and water; and introducing an efficient quantity of foaming agent and an efficient quantity of foaming gas or gases to form an aqueous foamed drilling fluid;
  injecting said aqueous foamed drilling fluid into a wellbore and circulating said fluid downhole;
  returning the aqueous foamed drilling fluid to the earth's surface and mechanically breaking the returned fluid.

28. The method of claim 27 in which the pH modifying agent is caustic soda.

29. A method comprising injecting a fluid comprising water, at least one clay, at least one foaming agent and at least one an additive component selected from aluminum hydroxide, magnesium hydroxide, mixed metal hydroxides, and blends thereof, into a well bore; and introducing a foam generating gas into the wellbore and forming an aqueous foamed drilling fluid downhole.

30. The method of claim 29 in which the foam generated downhole is pumped to the surface and mechanically broken.

31. The method of claim 30 in which the additive component is a mixed metal hydroxide selected from mixed metal hydroxides having the formula $$Li_mD_dT(OH)_{(m+2d+3+na)}A_a^n$$

wherein
  m represents the number of Li ions present; including 0;
  D represents a divalent metal selected from Mg, Ca, Ba, Sr, Mn, Fe, Co, Ni, Cu, and Zn;
  d is a number from 1 to about 4;
  T is a trivalent metal;
  A is a mono or polyvalent anion, other than OH;
  a represents the number of A ions present;
  n is the valence of A;
and (m+2d+3+na) is equal to or greater than 3.

32. The method of claim 28 in which the additive component is a mixed metal hydroxide selected from mixed metal hydroxides having the formula $$D_d T(OH)_{(2d+3+na)} A_a^n$$

wherein

D represents a divalent metal selected from Mg, Ca, Ba, Sr, Mn, Fe, Co, Ni, Cu, and Zn;

d is a-number from 1 to about 4;

T is a trivalent metal;

A is a mono or polyvalent anion, other than OH;

a represents the number of A ions present;

n is the valence of A;

and (2d+3+na) is equal to or greater than 3.

* * * * *